J. H. FRAMPTON.
Cultivator.
No. 25,403.
Patented Sept. 13, 1859.
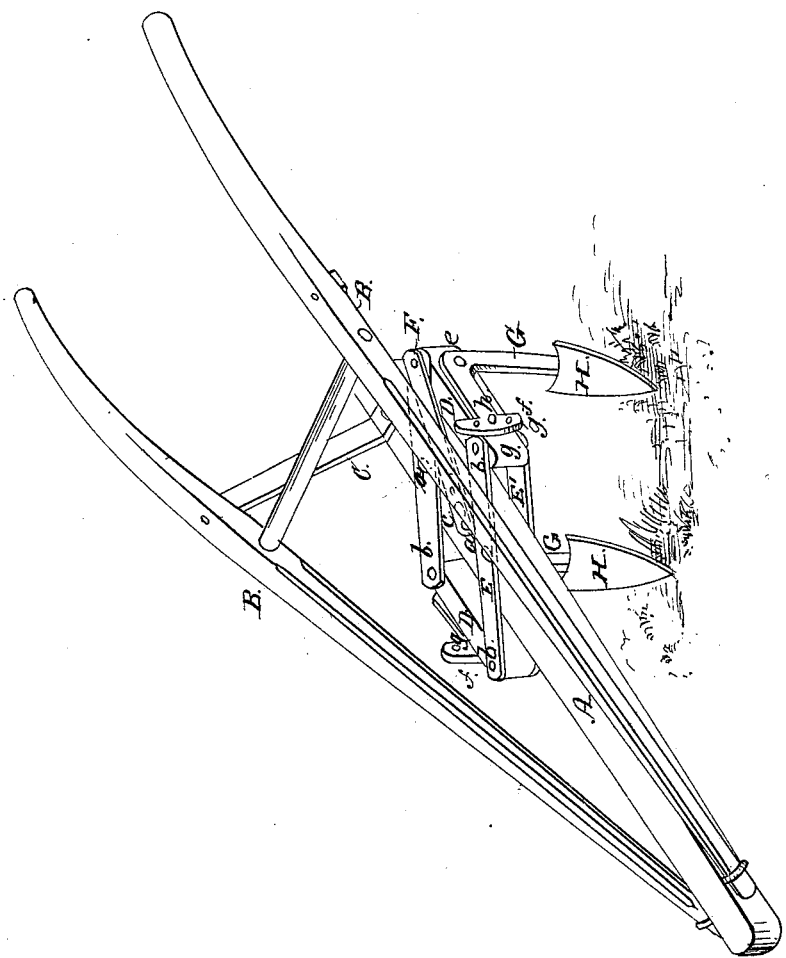
WITNESSES:
Joseph Richey
Henry Dee
INVENTOR
J. H. Frampton

UNITED STATES PATENT OFFICE.

J. H. FRAMPTON, OF HOPEWELL, OHIO.

IMPROVEMENT IN CULTIVATORS.

Specification forming part of Letters Patent No. 25,403, dated September 13, 1859.

*To all whom it may concern:*

Be it known that I, J. H. FRAMPTON, of Hopewell, in the county of Muskingum and State of Ohio, have invented a new and Improved Double-Shovel Plow; and I do hereby declare that the following is a full, clear, and exact description of the same, reference being had to the annexed drawing, making a part of this specification, said drawing being a perspective view of my invention.

This invention consists in a novel way of attaching the shares to the plow, whereby they may be readily adjusted nearer together or farther apart, or higher or lower, as the nature of the work may require.

To enable those skilled in the art to fully understand and construct my invention, I will proceed to describe it.

A represents a beam, to which two handles, B B, are attached, the front ends of the handles being attached to the front ends of the beam, and the back parts being secured or braced by a metal bar, C, which is attached to the back part of the beam.

D D are two parallel bars, the ends of which are connected by traverse-bars E E', that are secured by bolts $a$, which pass through the centers of the bars and through the beam A. There are two bars, E E', at each end of the bars D, the bars E being on the upper surface and the bars E' below. The ends of the bars E E' are connected to the bars D by pivots $b$.

To one end of one of the bars E—the hindmost one—a bar, F, is attached. This bar F is perforated with a series of holes, $c$, through either of which a pin, $d$, passes into a hole in the beam and secures the bars D D nearer to or farther from each other, as may be desired. The bars D D, it will be seen, when the pin $d$ is removed, may be moved parallelly but obliquely toward and from each other, the bars E E' working on the bolts $a$.

To each bar D a bent or V-shaped standard, G, is attached by a bolt, $e$. To the lower end of each standard a shovel-shaped share, H, is attached. The standards G are allowed to turn freely on the bolts $e$, and the ends of the upper part of said standards are each provided with a cross-arm, $f$, through which a series of holes, $g$, are made, and through either of which holes pins $h$ pass, one through each cross-arm $f$.

From the above description it will be seen that by adjusting the parallel bars D D the planes of the movement of the shares H H may be brought nearer together or farther apart, as desired, and by adjusting the standards G the shares may be made to penetrate the earth more or less deeply, as may be required. Thus by a very simple means the plow may be readily adapted for the cultivation of various crops and for operating in different soils.

I do not claim separately any of the parts; but

I do claim as new and desire to secure by Letters Patent—

The adjustable share-standards G G, attached to the parallel adjustable bars D D, which are secured to the beam A by the bars E E', the whole being combined and arranged substantially as and for the purpose set forth.

J. H. FRAMPTON.

Witnesses:
 JOSEPH RISHEY,
 HENRY DICK.